United States Patent
Olson et al.

(10) Patent No.: US 9,833,886 B1
(45) Date of Patent: Dec. 5, 2017

(54) FASTENER RETRIEVAL SYSTEM

(71) Applicant: The Boeing Company, Chicago, IL (US)

(72) Inventors: Mark Daniel Olson, Burien, WA (US); Richard P. McDermott, Des Moines, WA (US); Daniel J. Perron, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 847 days.

(21) Appl. No.: 13/852,661

(22) Filed: Mar. 28, 2013

(51) Int. Cl.
| | | |
|---|---|---|
| *B25B 13/02* | (2006.01) | |
| *B25B 23/08* | (2006.01) | |
| *B25B 23/10* | (2006.01) | |
| *B23B 47/00* | (2006.01) | |
| *B25B 23/02* | (2006.01) | |
| *B23Q 11/00* | (2006.01) | |

(52) U.S. Cl.
CPC .......... *B25B 23/02* (2013.01); *B23Q 11/0053* (2013.01); *B23Q 11/0071* (2013.01)

(58) Field of Classification Search
CPC ............ B23Q 11/0053; B23Q 11/0046; B23Q 11/0071; B67C 2011/025; B25B 23/02
USPC .......... 81/456, 451, 453, 125; 108/67, 72 R; 408/67, 72 R
See application file for complete search history.

(56) References Cited

U.S. PATENT DOCUMENTS

| | | | | | |
|---|---|---|---|---|---|
| 2,548,314 | A | * | 4/1951 | Kinney, Sr. ........ | B23Q 11/0064 269/8 |
| 2,702,181 | A | * | 2/1955 | Brown ................. | E21B 21/015 175/209 |
| 3,339,435 | A | * | 9/1967 | Heitz .................... | B23B 31/001 144/252.1 |
| 3,532,142 | A | * | 10/1970 | Ziegler ........................ | 81/456 |
| 3,536,149 | A | * | 10/1970 | Laird ................. | B23Q 11/0053 175/209 |
| 3,583,821 | A | * | 6/1971 | Shaub ................ | B23Q 11/0053 144/252.1 |
| 4,224,625 | A | * | 9/1980 | Peretz ...................... | H01Q 9/30 343/715 |
| 4,526,072 | A | * | 7/1985 | Manhoff, Jr. .................... | 81/451 |
| 4,623,458 | A | * | 11/1986 | Hakola .................. | B01D 45/12 209/139.2 |
| 4,714,138 | A | * | 12/1987 | Zaccone ........................ | 184/1.5 |
| 4,955,984 | A | * | 9/1990 | Cuevas .............. | B23Q 11/0053 408/67 |
| 4,982,628 | A | * | 1/1991 | DiForte .................. | B25B 13/06 81/125 |
| 5,087,158 | A | * | 2/1992 | Devine ................ | B23B 49/026 408/241 B |
| 5,160,230 | A | * | 11/1992 | Cuevas .............. | B23Q 11/0053 408/67 |

(Continued)

OTHER PUBLICATIONS

"New Power Drill Dust Collector Catcher for Bits," Globatek, Ltd., Ebay Auction, listed Dec. 11, 2012, 5 pages, accessed Mar. 27, 2013. http://www.ebay.com/itm/NEW-POWER-DRILL-DUST-COLLECTOR-CATCHER-4-10MM-BITS-/250804516891.

*Primary Examiner* — Bryan R Muller
(74) *Attorney, Agent, or Firm* — Yee & Associates, P.C.

(57) ABSTRACT

A method and apparatus comprising a structure and a connector. The structure may have a number of walls forming a channel with a first opening and a second opening. The connector may be associated with the first opening. The connector may be configured to change a size of the first opening.

5 Claims, 9 Drawing Sheets

(56) References Cited

U.S. PATENT DOCUMENTS

| | | | | |
|---|---|---|---|---|
| 5,292,210 | A * | 3/1994 | Nowick | B23B 51/0426 408/204 |
| 5,419,663 | A * | 5/1995 | Psomas | B23Q 11/0053 408/67 |
| 5,653,561 | A * | 8/1997 | May | B23Q 11/0046 408/67 |
| 5,979,516 | A * | 11/1999 | Grant | 141/331 |
| 6,116,125 | A * | 9/2000 | McLeod | 81/456 |
| 6,193,448 | B1 | 2/2001 | Brennan | |
| 6,338,357 | B1 * | 1/2002 | Zevgolis | B25B 27/0042 137/15.16 |
| 6,729,414 | B2 * | 5/2004 | Cooper | B25F 5/02 173/216 |
| 6,796,921 | B1 * | 9/2004 | Buck | B25F 5/001 173/47 |
| 7,175,371 | B2 * | 2/2007 | Vidal | B23Q 11/0064 408/1 R |
| 7,396,193 | B2 * | 7/2008 | Kesten | B23Q 11/0046 408/67 |
| D588,893 | S * | 3/2009 | Radich | D8/70 |
| 7,510,356 | B2 * | 3/2009 | Colon | B23B 51/12 408/1 R |
| 7,661,195 | B1 * | 2/2010 | Wood et al. | 30/392 |
| D677,292 | S * | 3/2013 | Barnes | D15/132 |
| 8,740,513 | B2 * | 6/2014 | Santamarina | B23B 49/005 175/211 |
| 2005/0000052 | A1 * | 1/2005 | Byles | A47L 9/02 15/314 |
| 2007/0243031 | A1 * | 10/2007 | Yun | B23B 47/00 408/67 |
| 2009/0172911 | A1 * | 7/2009 | Miyanaga | 15/339 |
| 2013/0034396 | A1 * | 2/2013 | Witthoeft | B23Q 11/0071 408/67 |
| 2013/0094915 | A1 * | 4/2013 | Chen | B23Q 11/0071 408/67 |
| 2014/0037392 | A1 * | 2/2014 | Lo | B23Q 11/0071 408/67 |
| 2014/0093320 | A1 * | 4/2014 | Sullivan | B23Q 11/0046 408/67 |

* cited by examiner

FASTENER RETRIEVAL SYSTEM

BACKGROUND INFORMATION

1. Field

The present disclosure relates generally to retrieving debris and, in particular, to retrieving fasteners. Still more particularly, the present disclosure relates to a method and apparatus for retrieving fasteners removed from objects.

2. Background

In manufacturing or maintenance of platforms, parts may need to be removed for replacement or inspection. Removing parts from a platform may involve removing fasteners.

After a fastener is removed from a part, the fastener may unintentionally fall onto the floor or surrounding objects. After falling, a fastener may be difficult to locate. Additionally, locating and retrieving fallen fasteners may be time-consuming. Fasteners which are not retrieved may pose a tripping hazard to employees. Replacing fasteners which are not retrieved may increase costs.

Further, when removing fasteners from parts, equipment may be located below the parts. This equipment may be sensitive to debris falling onto the equipment. After removing a fastener, the fastener may unintentionally fall onto the equipment. Fasteners falling onto the equipment may undesirably affect the equipment.

Therefore, it would be desirable to have a method and apparatus that takes into account at least some of the issues discussed above, as well as other possible issues.

SUMMARY

In an illustrative embodiment, an apparatus may comprise a structure and a connector. The structure may have a number of walls forming a channel with a first opening and a second opening. The connector may be associated with the first opening. The connector may be configured to change a size of the first opening.

In another illustrative embodiment, an apparatus may comprise a structure and a connector. The structure may have a number of walls forming a channel with a first opening and a second opening. The channel may be configured to surround a portion of a tool. The connector may be associated with the first opening. The connector may be a flexible seal. The connector may be configured to change a size of the first opening. The connector may have a third opening configured to change diameter as the connector is slid onto the tool.

In yet another illustrative embodiment, an apparatus may comprise a cylindrical structure, a connector, and a light source. The cylindrical structure may have a wall forming a channel with a first opening and a second opening. The channel may be configured to surround a portion of a tool. The tool may comprise one of a drill, an electric screwdriver, and a robotic arm. A length of the wall may be configured such that an operational member of the tool protrudes past the second opening from the channel. The connector may be a flexible seal cast from an elastomeric material and may be associated with the first opening. The connector may be configured to change a size of the first opening. The connector may have a third opening initially smaller than a clutch of the tool and configured to change diameter as the connector is slid onto the tool to form a seal. The seal may be configured to maintain a position of the connector on the clutch of the tool. The light source may be associated with one of the connector and the structure.

In a further illustrative embodiment, a method may be provided. An apparatus may be slid onto a tool. An operational member of the tool may be placed in contact with a fastener. The fastener may be removed from a workpiece using the tool such that the fastener is collected within the apparatus. The fastener may be retained within the apparatus.

In a further illustrative embodiment, a method may be provided. An apparatus comprising a connector and a structure may be slid onto a tool. The structure may have a number of walls forming a channel with a first opening and a second opening. The connector may be associated with the first opening. The connector may be configured to change a size of the first opening. An operational member of the tool may be placed in contact with a fastener. The fastener may be removed from a workpiece using the tool such that the fastener is collected in the channel.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the different illustrative embodiments recognize and take into account that a retrieval system associated with a tool may be desirable for retaining fasteners removed from a workpiece by the tool. Likewise, the different illustrative embodiments recognize and take into account that a retrieval system may desirably stretch to fit onto a variety of tools.

Likewise, the different illustrative embodiments recognize and take into account that a retrieval system may undesirably impede visibility during removal of a fastener. Accordingly, the different illustrative embodiments recognize and take into account that it may be desirable to be able to see through portions of a retrieval system. For example, it may be desirable to view debris within the retrieval system. Additionally, it may be desirable to be able to see an operational member of a tool engaging a fastener during removal of the fastener.

Further, the illustrative embodiments recognize that it may be desirable for a retrieval system to provide additional light to aid visibility. For example, it may be desirable to provide light within a retrieval system to view fasteners within the retrieval system. Additionally, it may be desirable to provide light to aid visibility of a fastener and an operational member of a tool during removal of the fastener.

Thus, the different illustrative embodiments provide a method and apparatus for containing debris, such as fasteners. In one illustrative example, an apparatus may comprise a structure and a connector. The structure may have a number of walls forming a channel with a first opening and a second opening. The connector may be associated with the first opening. The connector may be configured to change a size of the first opening.

Figure 1:
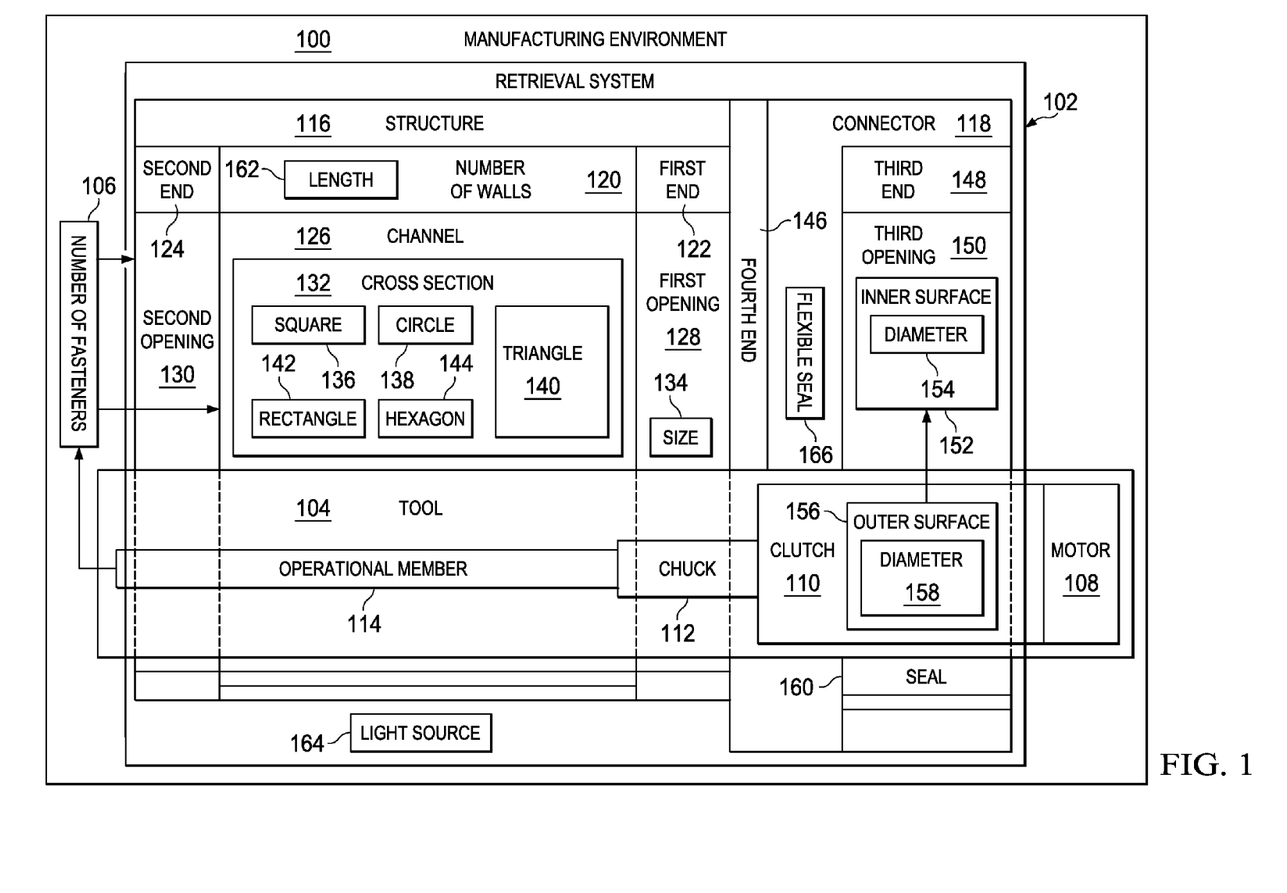
FIG. 1 is an illustration of a manufacturing environment in the form of a block diagram in accordance with an illustrative embodiment.

With reference now to FIG. 1, an illustration of a manufacturing environment in the form of a block diagram is depicted in accordance with an illustrative embodiment. Manufacturing environment 100 may include retrieval system 102 and tool 104 configured to remove and collect number of fasteners 106. As used herein, a "number of" items means one or more items. For example, number of fasteners 106 means one or more fasteners.

Number of fasteners 106 may take a number of different forms. For example, without limitation, number of fasteners may comprise at least one of screws, nails, bolts, or some other suitable type of fastener.

As used herein, the phrase "at least one of," when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations. The item may be a particular object, thing, or a category. In other words, "at least one of" means any combination of items and number of items may be used from the list but not all of the items in the list are required.

Tool 104 may be selected from, for example, without limitation, one of a drill, an electric screwdriver, a robotic arm, or other suitable tools. Tool 104 may comprise motor 108, clutch 110, chuck 112, and operational member 114. Motor 108 may drive rotational motion of chuck 112. Clutch 110 may control the force applied by motor 108 to chuck 112. Chuck 112 may be removably coupled with operational member 114. For example, without limitation, operational member 114 may comprise a screw bit gripped by chuck 112. Operational member 114 may be configured to engage number of fasteners 106.

Retrieval system 102 may be configured to removably couple to tool 104. Retrieval system 102 may comprise structure 116 and connector 118. Structure 116 and connector 118 may comprise two separate pieces. In some illustrative examples, connector 118 and structure 116 may comprise a unitary piece of material. In one illustrative example, connector 118 and structure 116 may be a unitary piece of an elastomeric material.

Structure 116 may comprise number of walls 120 and may have first end 122 and second end 124. Number of walls 120 may form channel 126 within structure 116. Channel 126 may be configured to surround a portion of tool 104. In some illustrative examples, channel 126 may be configured to surround chuck 112 or a portion of chuck 112.

Channel 126 may have first opening 128, second opening 130, and cross section 132. First opening 128 of channel 126 may have size 134 and may be on first end 122 of structure 116. Second opening 130 of channel 126 may be on second end 124 of structure 116. Second opening 130 of channel 126 may be configured to receive a fastener from number of fasteners 106.

Cross section 132 may be selected from square 136, circle 138, triangle 140, rectangle 142, and hexagon 144. In some illustrative examples, cross section 132 of channel 126 may be selected from other suitable shapes.

Connector 118 may retain fasteners within channel 126 along first end 122 of structure 116. Connector 118 may also maintain a position of retrieval system 102 relative to tool 104. Connector 118 may be associated with structure 116 along first end 122 of structure 116. Connector 118 may be associated with first opening 128 such that connector 118 is configured to change size 134 of first opening 128. When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Connector 118 may have fourth end 146 and third end 148. Fourth end 146 of connector 118 may be associated with first end 122 of structure 116. In some illustrative examples, connector 118 is configured to retain number of fasteners 106 inside channel 126 near first end 122.

Third end 148 of connector 118 may be associated with clutch 110 of tool 104. Third end 148 of connector 118 may have third opening 150. Third opening 150 may have inner surface 152 with diameter 154. As connector 118 is slid onto tool 104, inner surface 152 of third opening 150 may engage outer surface 156 of clutch 110 having diameter 158.

In some illustrative examples, connector 118 may take the form of flexible seal 166. In these illustrative examples, diameter 158 may be larger than diameter 154. In some illustrative examples, as flexible seal 166 is slid onto tool 104, outer surface 156 of clutch 110 may change diameter 154 of third end 148. Third opening 150 may be configured to change diameter 154 as connector 118 is slid onto tool 104. For example, and without limitation, third opening 150 may stretch to fit around outer surface 156 of clutch 110.

Connector 118 and clutch 110 may form seal 160 along inner surface 152 and outer surface 156. Seal 160 may be configured to maintain a position of connector 118 on tool 104. By maintaining a position of connector 118 on tool 104, seal 160 may also maintain a position of retrieval system 102 relative to tool 104.

As depicted, operational member 114 may protrude past second opening 130 from channel 126. Length 162 of number of walls 120 may be configured such that operational member 114 may protrude past second opening 130 from channel 126.

Retrieval system 102 may also have light source 164. Light source 164 may be associated with one of structure 116 and connector 118. In one illustrative non-limiting example, light source 164 may be embedded in connector 118. Light source 164 may provide light within retrieval system 102. In some illustrative examples, light source 164 may provide light within channel 126. In some illustrative examples, light source 164 may provide light near operational member 114. Light source 164 may aid in visibility of operational member 114 engaging a fastener in number of fasteners 106 during removal of the fastener.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, retrieval system 102 may not include light source 164. In another illustrative example, channel 126 may have a cross section 132 other than square 136, circle 138, triangle 140, rectangle 142, and hexagon 144, such as an oval. In yet another illustrative example, connector 118 may form seal 160 with a different portion of tool 104, other than clutch 110.

With reference now to FIGS. 2-8, illustrations of a retrieval system are depicted in accordance with an illustrative embodiment. The different components shown in FIGS. 2-8 for retrieval system 200 may be combined with components in FIG. 1, used with components in FIG. 1, or a combination of the two. Additionally, some of the components in these figures may be illustrative examples of how components shown in block form in FIG. 1 may be implemented as physical structures.

Figure 2:
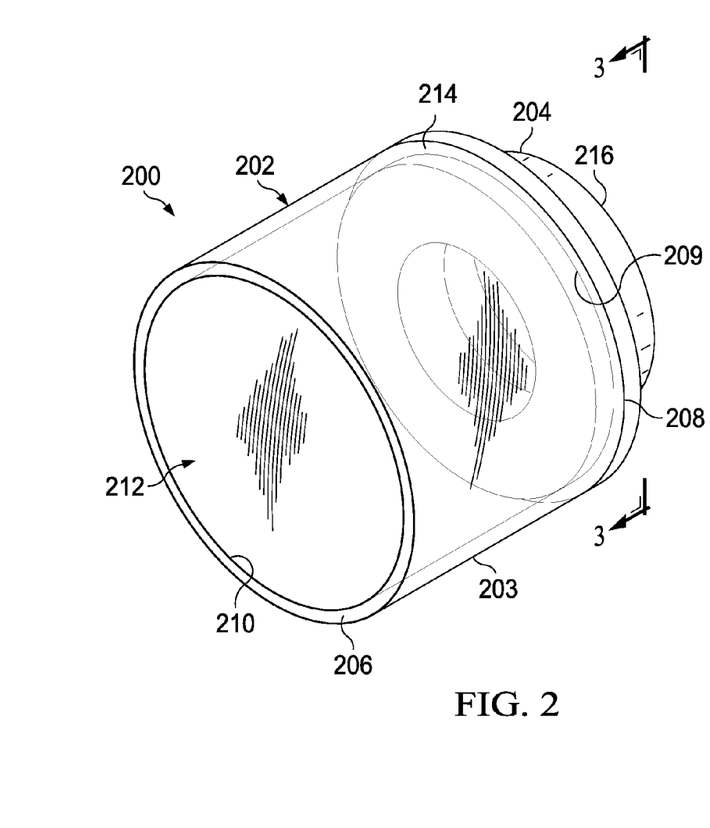
FIG. 2 is an illustration of a retrieval system in accordance with an illustrative embodiment.

Turning now to FIG. 2, an illustration of a retrieval system is depicted in accordance with an illustrative embodiment. In this illustrative example, retrieval system 200 may be an example of one implementation for retrieval system 102 in FIG. 1. As depicted, retrieval system 200 may include structure 202 and connector 204.

Structure 202 may take the form of cylindrical wall 203 in this depicted example. Cylindrical wall 203 may be comprised of a number of different materials. These materials may include for example, without limitation, polycarbonate, acrylic, PVC, urethanes, or other suitable types of materials.

As depicted, structure 202 may have first end 208 and second end 206. Cylindrical wall 203 may form channel 212. Channel 212 may have second opening 210 at second end 206. As depicted, channel 212 has a cross-section of a circle.

As depicted, objects within channel 212 may be viewed through cylindrical wall 203. As depicted, cylindrical wall 203 may be comprised of a material which does not significantly impair visibility of debris within channel 212. In some illustrative examples, cylindrical wall 203 may be comprised of a transparent, substantially transparent, or translucent material.

As depicted, structure 202 is associated with connector 204 along first end 208. Connector 204 may be comprised of a number of different materials. These materials may include for example, without limitation, urethanes, silicones, or castable rubbers. In one illustrative non-limiting example, connector 204 may be cast from an elastomeric material.

Connector 204 has fourth end 214 and third end 216. Fourth end 214 of connector 204 is associated with first end 208 of structure 202. Fourth end 214 may be configured to change a size of first opening 209 of first end 208 of structure 202.

Figure 3:
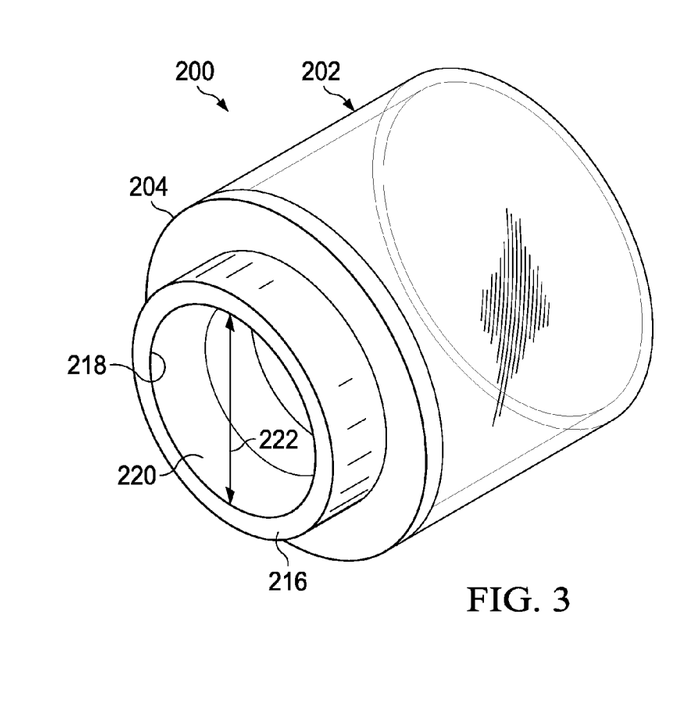
FIG. 3 is an illustration of a retrieval system in accordance with an illustrative embodiment.

Turning now to FIG. 3, an illustration of a retrieval system is depicted in accordance with an illustrative embodiment. In this illustrative example, retrieval system 200 is depicted from direction 3 of FIG. 2. As depicted, third end 216 has third opening 218. Third opening 218 has inner surface 220 and diameter 222.

Figure 4:
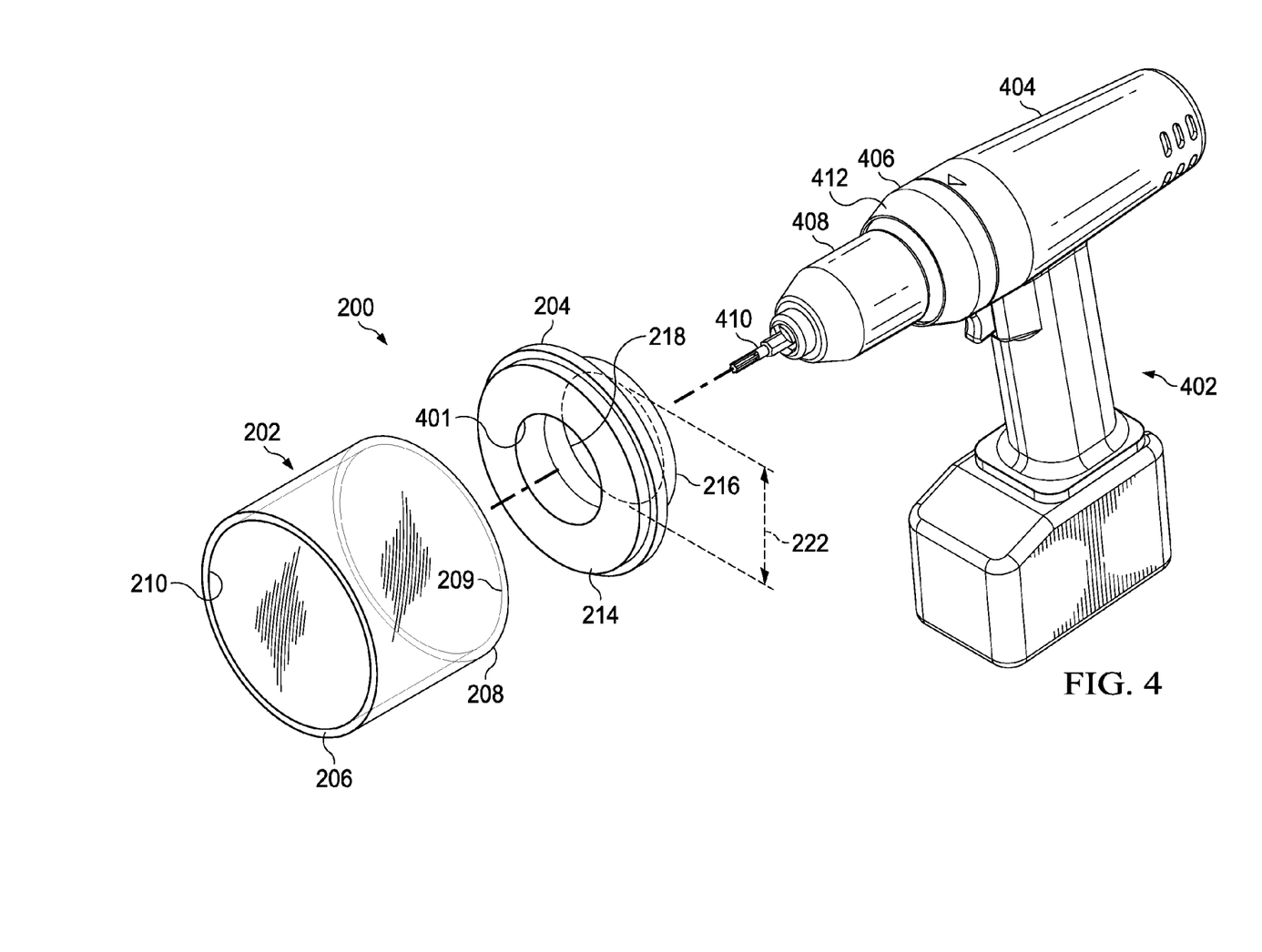
FIG. 4 is an illustration of an exploded perspective view of a retrieval system and a tool in accordance with an illustrative embodiment.

Turning now to FIG. 4, an illustration of an exploded perspective view of a retrieval system and a tool is depicted in accordance with an illustrative embodiment. In this illustrative example, tool 402 may be an example of one implementation for tool 104 in FIG. 1.

As depicted, retrieval system 200 may include structure 202 and connector 204. Structure 202 may have second opening 210 at second end 206. Structure 202 may have first opening 209 at first end 208.

First end 208 of structure 202 may be configured to be coupled to fourth end 214 of connector 204. When fourth end 214 of connector 204 is coupled to first end 208, fourth end 214 of connector 204 may reduce the size of first opening 209. Fourth opening 401 of connector 204 may be smaller than first opening 209.

Connector 204 may be slid onto tool 402. Tool 402 may have motor 404, clutch 406, chuck 408, and operational member 410. Clutch 406 may have outer surface 412. When sliding connector 204 onto tool 402, chuck 408 may enter third opening 218. If operational member 410 is coupled to chuck 408 prior to sliding connector 204 onto tool 402, operational member 410 may enter third opening 218 when sliding connector 204 onto tool 402. In one non-limiting example, diameter 222 of third opening 218 may be configured to be smaller than outer surface 412 of clutch 406. As clutch 406 is slid into third opening 218, diameter 222 of third opening 218 may change. In another non-limiting example, diameter 222 of third opening 218 may be configured to fit outer surface 412 of clutch 406 without changing.

Figure 5:
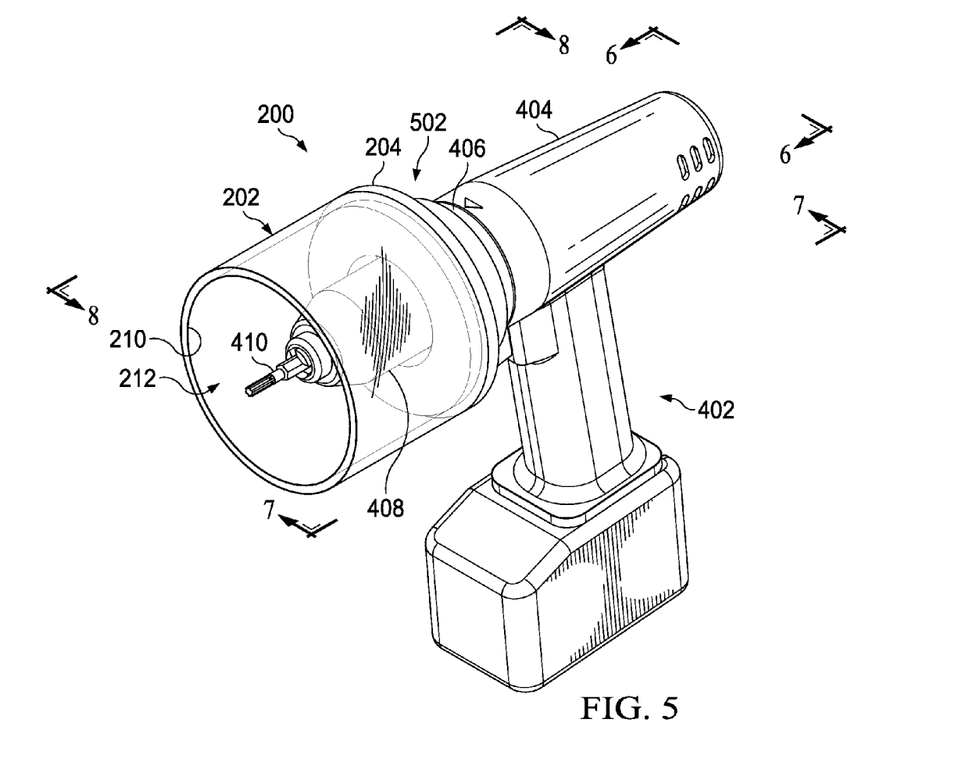
FIG. 5 is an illustration of a retrieval system and a tool in accordance with an illustrative embodiment.

Turning now to FIG. 5, an illustration of a retrieval system and a tool is depicted in accordance with an illustrative embodiment. As depicted, retrieval system 200 may be associated with tool 402. Connector 204 may be associated with clutch 406, forming seal 502. Channel 212 of structure 202 may surround portions of chuck 408 and operational member 410. Operational member 410 may protrude from second opening 210 of channel 212.

Figure 6:
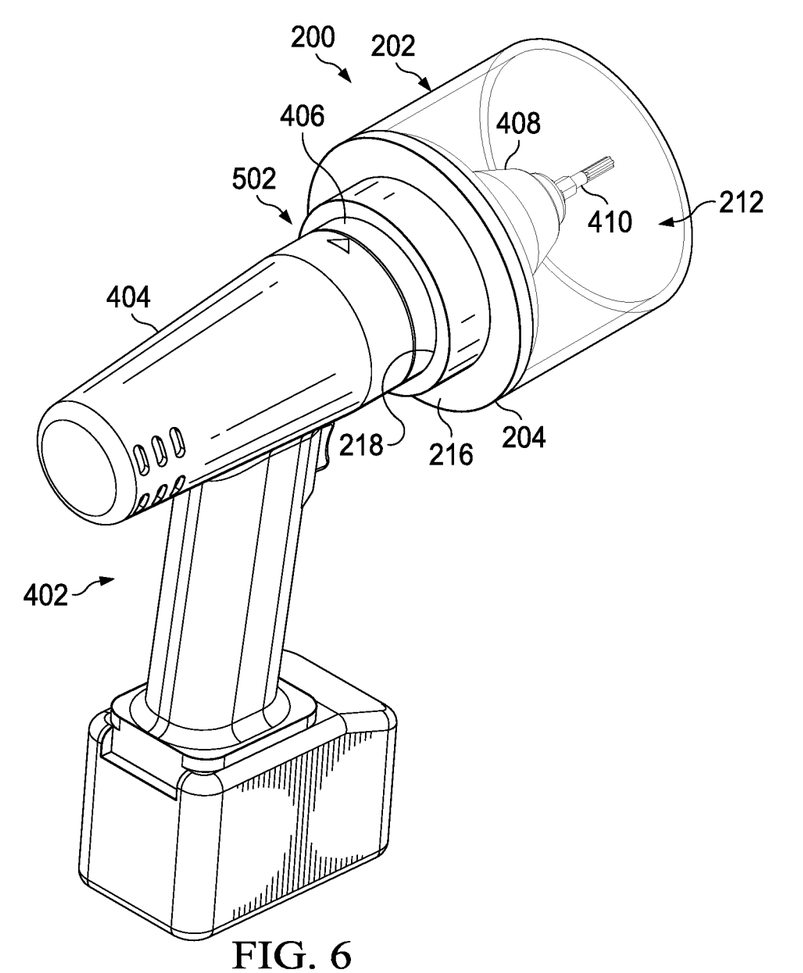
FIG. 6 is an illustration of a second view of a retrieval system and a tool in accordance with an illustrative embodiment.

With reference now to FIG. 6, an illustration of a second view of a retrieval system and a tool is depicted in accordance with an illustrative embodiment. Retrieval system 200 and tool 402 are depicted from direction 6 of FIG. 5. As depicted, retrieval system 200 may be associated with tool 402. Connector 204 may be associated with clutch 406, forming seal 502. Channel 212 of structure 202 may surround portions of chuck 408 and operational member 410.

Figure 7:
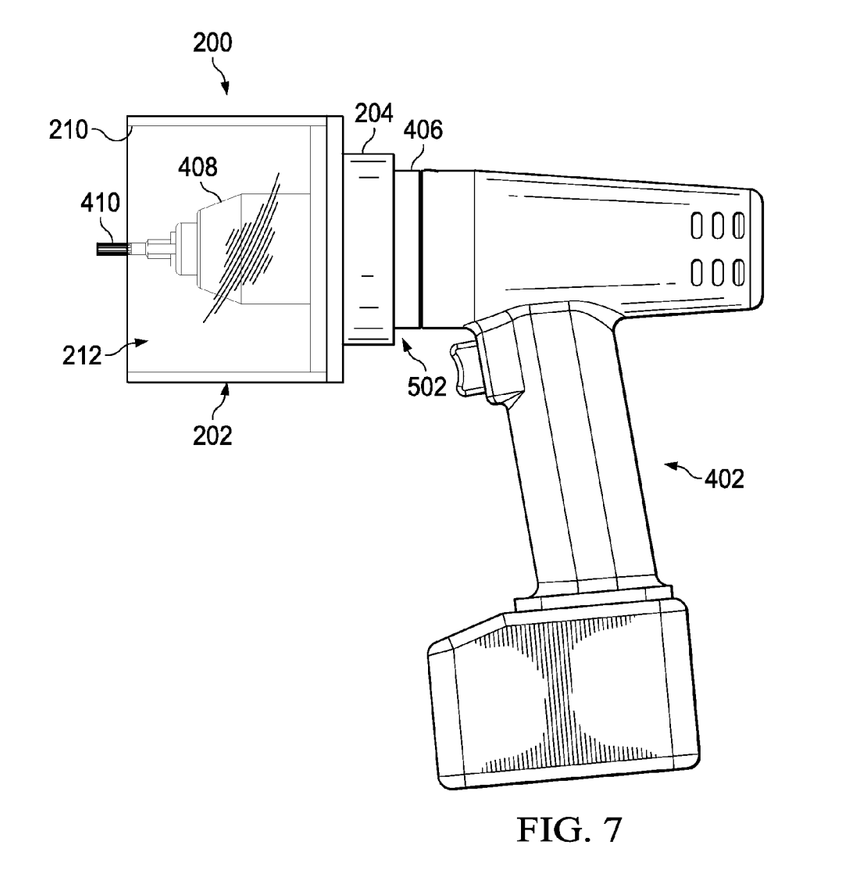
FIG. 7 is an illustration of a third view of a retrieval system and a tool in accordance with an illustrative embodiment.

Turning now to FIG. 7, an illustration of a third view of a retrieval system and a tool is depicted in accordance with an illustrative embodiment. Retrieval system 200 and tool 402 are depicted from direction 7 of FIG. 5. As depicted, retrieval system 200 may be associated with tool 402. Connector 204 may be associated with clutch 406, forming seal 502. Channel 212 of structure 202 may surround portions of chuck 408 and operational member 410. Operational member 410 may protrude from second opening 210 of channel 212.

Figure 8:
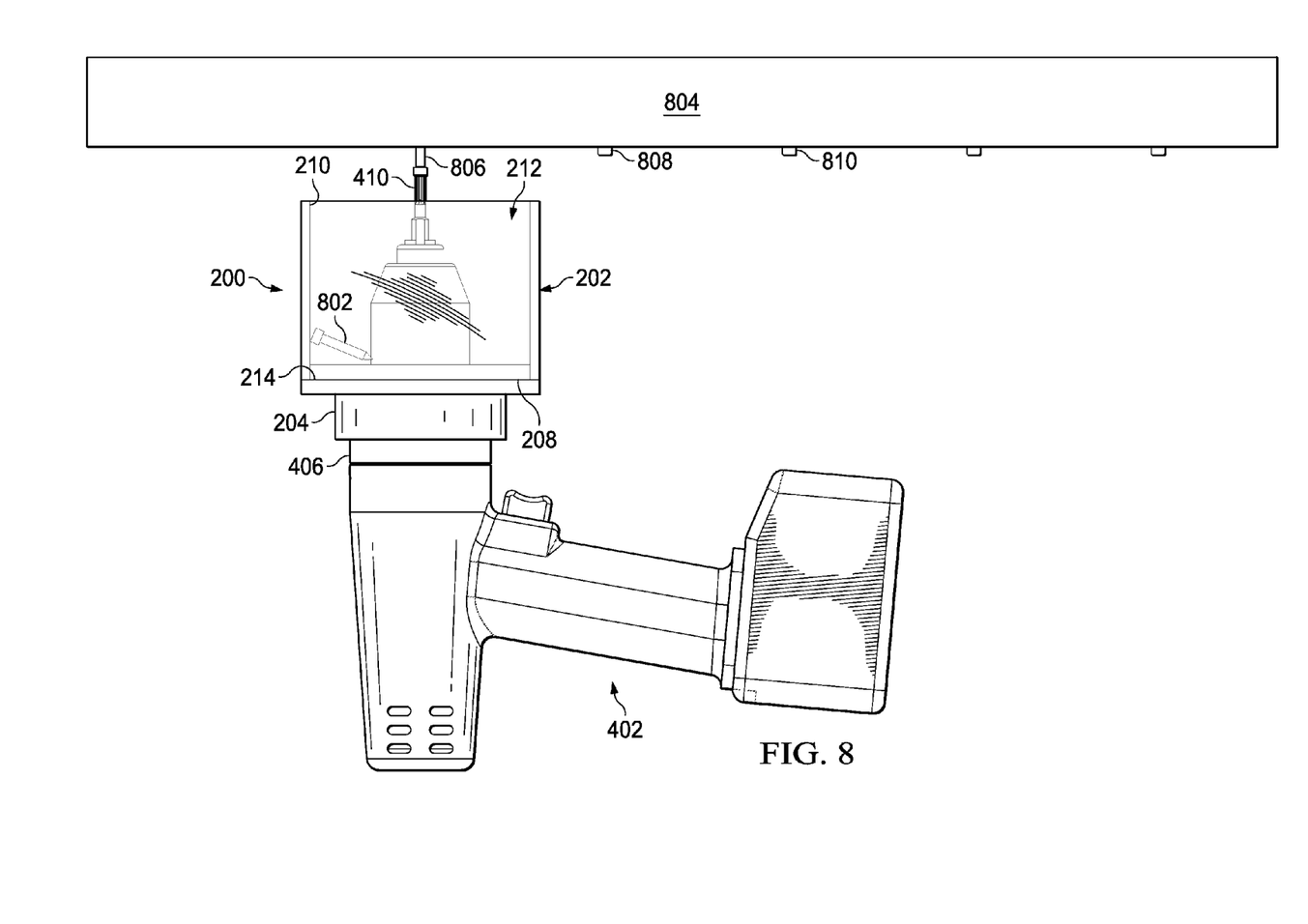
FIG. 8 is an illustration of removing a fastener using a retrieval system and a tool in accordance with an illustrative embodiment.

Turning now to FIG. 8, an illustration of removing a fastener using a retrieval system and a tool is depicted in accordance with an illustrative embodiment. Retrieval system 200 and tool 402 are depicted from direction 8 in FIG. 5.

Retrieval system 200 and tool 402 may be used to remove fasteners from workpiece 804. Workpiece 804 may have fastener 806, fastener 808, and fastener 810 within workpiece 804. As depicted, retrieval system 200 may contain fastener 802 within channel 212 of structure 202. Fourth end 214 of connector 204 may retain fastener 802 within channel 212 along first end 208 of structure 202.

As depicted, operational member 410 may protrude from channel 212 through second opening 210 of structure 202. Operational member 410 of tool 402 may engage fastener 806 and remove fastener 806 from workpiece 804. As fastener 806 is removed from workpiece 804, fastener 806 may fall from operational member 410 through second opening 210 of structure 202. Channel 212 may receive fastener 806. Fourth end 214 of connector 204 may retain fastener 806 within channel 212 near first end 208.

Tool 402 may also be used to remove fastener 808 and fastener 810 from workpiece 804. After removing fastener 808 from workpiece 804, fastener 808 may fall through second opening 210 into channel 212. Channel 212 may be configured to contain a number of fasteners, such as, without limitation, fastener 802 and fastener 806. Channel 212 may be configured to contain a number of fasteners without undesirably affecting removal of subsequent fasteners.

Figure 9:
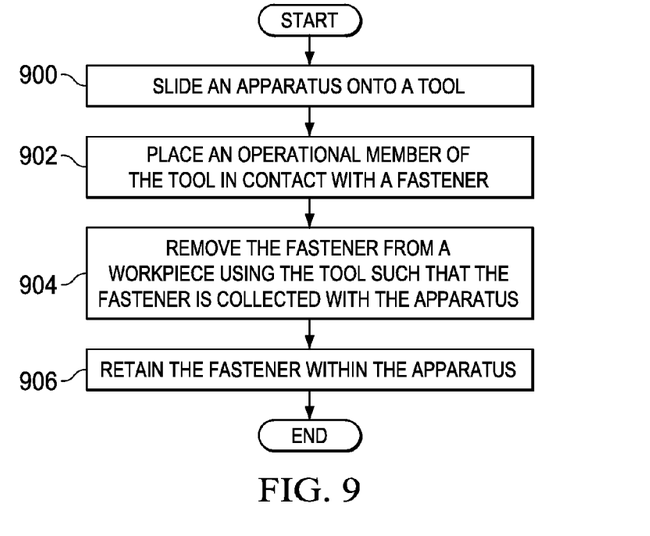
FIG. 9 is an illustration of a flowchart of a process for removing and retrieving a fastener in accordance with an illustrative embodiment.

Turning now to FIG. 9, an illustration of a flowchart of a process for removing and retrieving a fastener is depicted in accordance with an illustrative embodiment. The process illustrated in FIG. 9 may be implemented using retrieval system 102 in FIG. 1. Further, this process may be implemented to remove and retrieve number of fasteners 106 in FIG. 1.

The process may begin by sliding an apparatus onto tool 104 (operation 900). The apparatus may be retrieval system 102 of FIG. 1. The process may then place operational member 114 of tool 104 in contact with a fastener (operation 902). The fastener may be a fastener in number of fasteners 106 of FIG. 1. The process may then remove the fastener from a workpiece using tool 104 such that the fastener falls into the apparatus (operation 904). The process may then retain the fastener within the apparatus (operation 906).

Figure 10:
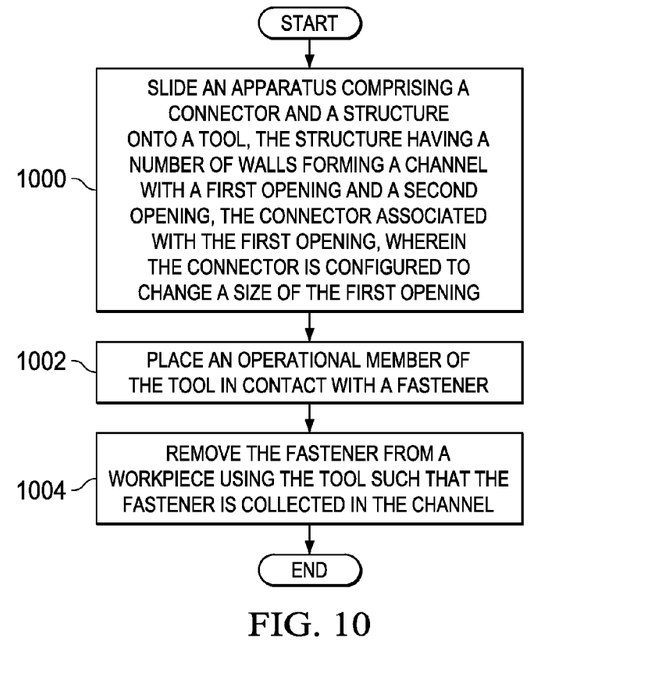
FIG. 10 is an illustration of a flowchart of a process for removing and retrieving a fastener in accordance with an illustrative embodiment.

Turning now to FIG. 10, an illustration of a flowchart of a process for removing and retrieving a fastener is depicted in accordance with an illustrative embodiment. The process illustrated in FIG. 10 may be implemented using retrieval system 102 in FIG. 1. Further, this process may be implemented to remove and retrieve number of fasteners 106 in FIG. 1.

The process may begin by sliding an apparatus comprising connector 128 and structure 126 onto tool 104 (operation 1000). In operation 1000, structure 126 may have number of walls 120 forming channel 126 with first opening 128 and second opening 130. Connector 128 may be associated with the first opening 128. Additionally, connector 128 may be configured to change size 134 of first opening 128. The process may then place operational member 124 of tool 104 in contact with a fastener (operation 1002). The fastener may be a fastener in number of fasteners 106 of FIG. 1. The process may then remove the fastener from a workpiece using tool 104 such that the fastener is collected in channel 126 (operation 1004).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
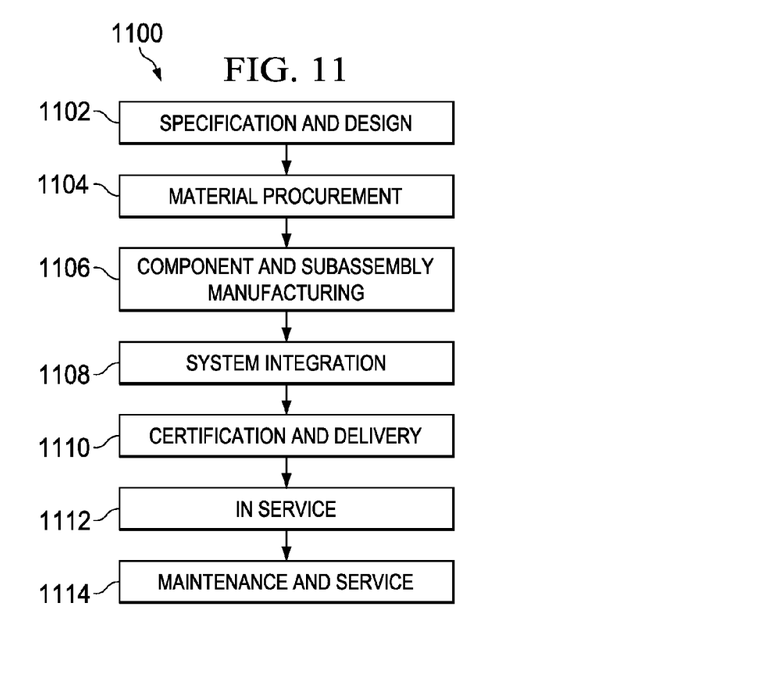
FIG. 11 is an illustration of an aircraft manufacturing and service method in the form of a block diagram in accordance with an illustrative embodiment.
Figure 12:
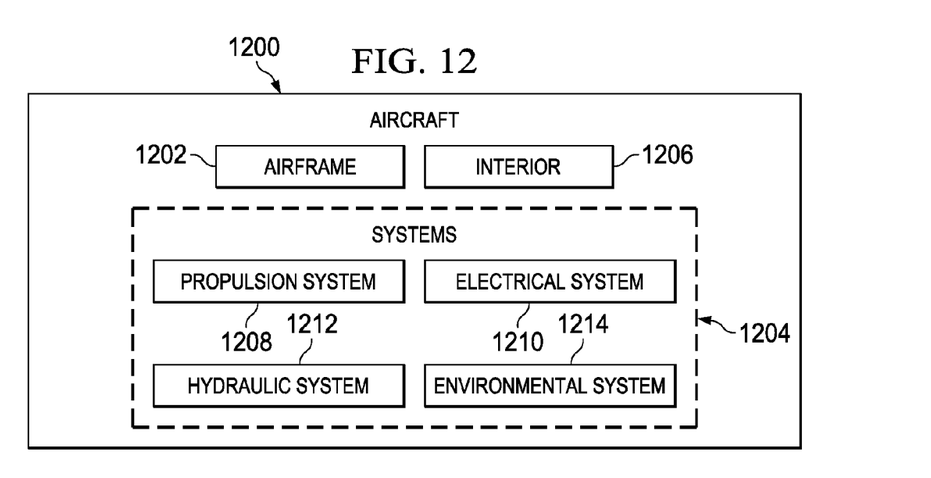
FIG. 12 is an illustration of an aircraft in the form of a block diagram in which an illustrative embodiment may be implemented.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in the form of a block diagram in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in the form of a block diagram in which an illustrative embodiment may be implemented. In this example, aircraft 1200 is produced by aircraft manufacturing and service method 1100 in FIG. 11 and may include airframe 1202 with plurality of systems 1204 and interior

1206. Examples of systems 1204 include one or more of propulsion system 1208, electrical system 1220, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. One or more illustrative embodiments may be used during component and subassembly manufacturing 1106. For example, retrieval system 112 of FIG. 1 may be used to retrieve fasteners during component and subassembly manufacturing 1106. Further, retrieval system 112 of FIG. 1 may also be used to perform rework during maintenance and service 1114. For example, fasteners may be removed from a part of aircraft 1200 in order to remove and replace the part during scheduled maintenance for aircraft 1200.

Thus, the different illustrative embodiments provide a method and apparatus for containing debris, such as fasteners. In one illustrative example, an apparatus may comprise a structure and a connector. The structure may have a number of walls forming a channel with a first opening and a second opening. The connector may be associated with the first opening. The connector may be configured to change a size of the first opening.

In particular, the different illustrative embodiments may provide a method for removing and retaining fasteners. Specifically, the different illustrative embodiments provide a retrieval system associated with a tool and configured to receive and retain fasteners after removal of the fasteners by the tool.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
providing a fastener retrieval apparatus, the apparatus consisting of:
  a cylindrical structure forming a channel having a first length, a first opening and second opening, the cylindrical structure having a uniform inner diameter along all of the first length and a uniform outer diameter along all of the first length; and
  a flexible elastomeric connector of unitary construction associated with the first opening, the connector consisting of:
    a first section having a second length with a uniform first section outer diameter along all of the second length configured to form an interference fit with the uniform inner diameter of the first opening of the cylindrical structure;
    a second section having a third length with a uniform second section outer diameter along all of the third length that is equal to the uniform outer diameter of the cylindrical structure; and
    a third section having a fourth length with a uniform third section outer diameter along all of the fourth length and a uniform third section inner diameter along all of the fourth length that is configured for engagement with a tool clutch;
sliding the apparatus over an operational member of a tool and onto the tool such that the third section inner diameter of the connector engages the tool clutch of the tool and the operational member protrudes from the channel past the second opening, wherein the flexible elastomeric connector does not extend beyond an end of a chuck of the tool;
placing the operational member of the tool in contact with a fastener;
removing the fastener from a workpiece using the tool such that the fastener is collected within the apparatus;
retaining the fastener within the cylindrical structure of the apparatus; and
removing subsequent fasteners from a workpiece using the tool such that the subsequent fasteners are collected within the apparatus, wherein the fastener retained within the cylindrical structure does not undesirably affect removal of the subsequent fasteners;
wherein when the first section forms the interference fit with the uniform inner diameter of the first opening of the cylindrical structure, an entire length of the fastener retrieval apparatus consists of the first length, the third length and the fourth length.

2. The method of claim 1, wherein the structure is made from at least one of polycarbonate, acrylic, PVC, and a urethane.

3. The method of claim 2, wherein the connector is made from at least one of urethanes, silicones, and castable rubbers.

4. The method of claim 2, wherein the tool is selected from one of a drill, an electric screwdriver, and a robotic arm.

5. A fastener retrieval apparatus, the apparatus consisting of:
a cylindrical structure forming a channel having a first length, a first opening and second opening, the cylindrical structure having a uniform inner diameter along all of the first length and a uniform outer diameter along all of the first length; and
a flexible elastomeric connector of unitary construction associated with the first opening, the connector consisting of:
  a first section having a second length with a uniform first section outer diameter along all of the second length configured to form an interference fit with the uniform inner diameter of the first opening of the cylindrical structure;
  a second section having a third length with a uniform second section outer diameter along all of the third length that is equal to the uniform outer diameter of the cylindrical structure; and
  a third section having a fourth length with a uniform third section outer diameter along all of the fourth length and a uniform third section inner diameter along all of the fourth length that is configured for engagement with a tool clutch;
wherein when the first section forms the interference fit with the uniform inner diameter of the first opening of the cylindrical structure, an entire length of the fastener retrieval apparatus consists of the first length, the third length and the fourth length.

* * * * *